United States Patent Office 3,342,785
Patented Sept. 19, 1967

3,342,785
3 - HYDROXY - 3 - METHYLCYCLOBUTANECAR-
BOXYLIC ACIDS, LACTONES THEREOF AND
THEIR POLYMERS
Elwood P. Blanchard, Jr., Wilmington, Del., assignor to
E. I. du Pont de Nemours and Company, Wilmington,
Del., a corporation of Delaware
No Drawing. Filed Dec. 20, 1963, Ser. No. 332,299
15 Claims. (Cl. 260—78.3)

ABSTRACT OF THE DISCLOSURE

3 - hydroxy - 3 - methylcyclobutanecarboxylic acids, lactones thereof and their polymers are claimed. The acids are produced by contacting a hydrohalide with a 3-methylenecyclobutanecarboxylic acid, hydrolysis of the product with an aqueous alkali-metal hydroxide, and then acidification or alternatively by contacting a 1-cyano-3-methylbicyclo[1.1.0]butane with an alkali-metal hydroxide followed by acidification. Controlled dehydration of the acids produces the lactones or polymers. The acids and lactones are useful for preparing the polymers which can be used in the form of films and as coating compositions.

---

This invention relates to new hydroxycarboxylic acids and their lactones, to their polymers, and to methods for their preparation.

The compounds of this invention are 3-hydroxycyclobutanecarboxylic acids, alkyl and fluoroalkyl-substituted 3-hydroxycyclobutanecarboxylic acids, lactones of the above, and polymers of said hydroxy acids and lactones, including both homopolymers and copolymers with at least one other copolymerizable monomer.

The hydroxy acids of this invention have the general formula

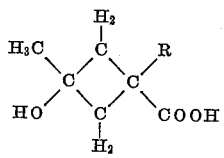

wherein R is hydrogen, methyl or fluoroalkyl (preferably perfluoroalkyl of 1 to 6 carbons).

The lactones of this invention have the general formula

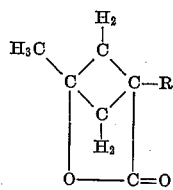

wherein R has the same meaning as in the preceding paragraph.

The polymers of this invention, which are obtained from either the hydroxy acids or their lactones, are polyesters containing recurring units of the following formula:

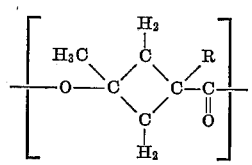

wherein R has the same meaning as in the preceding paragraph.

The hydroxymethylcyclobutanecarboxylic acids of this invention wherein R is hydrogen or methyl can be prepared by reaction of 3-iodo-3-methylcyclobutanecarboxylic acid or 3-iodo-1,3-dimethylcyclobutanecarboxylic acid with aqueous alkali metal hydroxide, e.g., sodium hydroxide, followed by acidification of the reaction product with a mineral acid, e.g., sulfuric acid.

The reaction conditions for the first step in this process are not critical, reaction between the iodomethylcyclobutanecarboxylic acid and the aqueous alkali metal hydroxide taking place rapidly when the reactants are mixed together at room temperature. Aqueous alkali metal hydroxide solutions ranging from 5% to 50% concentration can be used. Lithium, sodium, potassium, rubidium, and cesium hydroxides can all be employed. The proportions of the two reactants employed in the process are not critical. However, since two moles of alkali metal hydroxide react with one mole of the iodomethylcyclobutanecarboxylic acid, at least two moles of hydroxide per mole of acid should be used for economic results. Preferably, a slight excess, e.g., 10–20% excess, of alkali metal hydroxide is employed in order to obtain maximum yields of the products based on the iodomethylcyclobutanecarboxylic acid employed. As indicated above, reaction takes place rapidly at ordinary temperatures; however, reaction temperatures ranging from 0° to 100° C. can be used. Under these temperature conditions, reaction takes place over a period of time ranging from a few minutes, e.g., 5–10 minutes up to several hours, e.g., 2–4 hours.

In the hydrolysis step of this process any mineral acid, e.g., sulfuric, hydrochloric or phosphoric acid, in a wide variety of concentrations ranging from 5% to 50% or more can be used. The amount of mineral acid employed should at least be sufficient to produce a neutral reaction mixture. However, better precipitation of the desired hydroxymethylcyclobutanecarboxylic acid occurs when the reaction mixture is acidified to a pH of 2. Accordingly, it is preferred that this be done.

The iodomethylcyclobutanecarboxylic acid starting materials used in the above process can be prepared by stirring 55% hydriodic acid with 3-methylenecyclobutanecarboxylic acid or 1-methyl-3-methylenecyclobutanecarboxylic acid (U.S. Patent 2,914,541) at room temperature for a few minutes, e.g., 30–90 minutes. The iodo acid precipitates from the reaction mixture on addition of ice water. The precipitated acid can be used directly in the process of this invention, or it can be purified if desired.

An alternative process for the preparation of 3-hydroxy - 3 - methylcyclobutanecarboxylic acid comprises heating a mixture of one mole of 1-cyano-3-methylbicyclo[1.1.0]butane with an aqueous solution of 1.5 moles of an alkali metal hydroxide, e.g., potassium hydroxide, at a temperature of 50°–160° C., preferably 100° C., for several hours, e.g., three hours. The resulting clear solution is then acidified to a pH of 2 with a mineral acid, e.g., sulfuric acid, and the resulting acid solution extracted with diethyl ether. Removal of the ether by evaporation leaves the desired 3-hydroxy-3-methylcyclobutanecarboxylic acid, which can be purified, if desired, by recrystallization from 1,2-dichloroethane.

The 1-cyano-3-methylbicyclo[1.1.0]butane used in the above process can be prepared from 1-cyano-3-methylenecyclobutane by treatment first with hydrogen iodide, preferably an aqueous solution containing 10–60% hydrogen iodide, to obtain 1-cyano-3-methyl-3-iodocyclobutane which is then treated with an alkali metal hydride, e.g., sodium hydride, to produce 1-cyano-3-methylbicyclo[1.1.0]butane. This process is described more fully in my coassigned, copending patent application Ser. No. 282,867, filed May 24, 1963, now U.S. 3,234,264.

The lactones of 3-hydroxy-3-methylcyclobutane-carboxylic acid and 3-hydroxy-1,3-dimethylcyclobutanecarboxylic acid can be prepared by bringing a 3-halo-3-methylcyclobutanecarboxylic acid or a 3-halo-1,3,-dimethylcyclobutanecarboxylic acid into intimate contact with one equivalent of an alkali metal hydride in an inert reaction medium followed by pyrolysis of the resulting acid salt. The 3-halomethylcyclobutanecarboxylic acids that are operable include the chloro-, bromo-, and iodo-acids. Suitable alkali metal hydrides for use in the first step include the hydrides of lithium, sodium, potassium, rubidium and cesium. The metal hydride may be employed as such, suitably in powdered form, or it may be suspended in an inert medium such as a saturated hydrocarbon oil. Any inert organic solvent can be used as reaction medium in this process; however, an ethereal medium is preferred since the ethers are better solvents for the salt that is formed. Specific reaction media that are operable include ethers, e.g., diethyl ether, tetrahydrofuran, and ethylene glycol dimethyl ether, and hydrocarbons, e.g., benzene and hexane. Intimate contact between the reactants can be obtained by simple agitation. Temperature and pressure above and below room temperature and atmospheric pressure are operable. However, temperatures of 80° C. and higher should not be used since the salt produced in the reaction decomposes at such temperatures. Reaction temperatures ranging from 0° to 75° C. are satisfactory; however, it is preferred that temperatures of below 35° C. be employed. Reaction between the alkali metal hydride and the iodo-acid is quite rapid; consequently, reaction times of only a few minutes, e.g., 30–45 minutes, are satisfactory. Longer reaction times, e.g., up to 16 hours or more, can be used if desired.

The alkali metal salt of the halomethylcyclobutanecarboxylic acid produced in the first step described above is converted to the lactone by heating it at 80–180° C. This pyrolysis can be carried out in various ways. In one method the alkali metal salt is filtered from the reaction mixture obtained as described in the preceding paragraph and then heated at about 90–95° C. whereupon the lactone formed from the salt sublimes and is collected on a cool surface. A second method for carrying out the pyrolysis comprises adding to the reaction mixture obtained as described in the preceding paragraph, a high boiling hydrocarbon and then removing the low boiling reaction medium from the mixture by evaporation at reduced pressure. The residue is then heated in the presence of the high boiling hydrocarbon at 90–180° C. and the lactone that is formed is distilled out of the mixture and collected in a cold receiver. The lactone obtained by either of these methods can be purified, if desired, by recrystallization from hexane.

An alternative method for the preparation of the lactones defined above comprises reacting 3-hydroxy-3-methylcyclobutanecarboxylic acid or 3-hydroxy-1,3-dimethylcyclobutanecarboxylic acid with a dihydrocarbylcarbodiimide, e.g., dicyclohexylcarbodiimide, in equimolar amounts in ethereal reaction medium, e.g., tetrahydrofuran. Reaction takes place at ordinary room temperature but temperatures ranging from 0° up to 100° C. can be used if desired. Temperatures in the range 20° to 35° C. are convenient. After completion of the reaction the by-product dihydrocarbylurea that forms is removed by filtration and the filtrate is concentrated. The residue containing the lactone of the hydroxy acid can be purified by crystallization and by distillation if desired. The dihydrocarbylcarbodiimides employed in this process are commercially available.

The hydroxycarboxylic acids of this invention wherein R is a fluoroalkyl group, and their lactones can be prepared in accordance with the following reaction scheme:

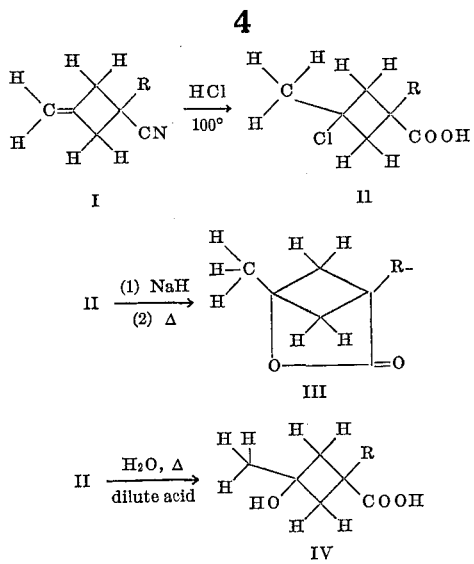

The chloroacids II can be prepared by heating the appropriate 3-methylene - 1-perfluoroalkylcyclobutanecarbonitrile with concentrated hydrochloric acid at 100° C. in a closed vessel. For example, the reaction of 3-methylene - 1-trifluoromethylcyclobutanecarbonitrile (I, R=CF$_3$) with concentrated hydrochloric acid for 8 hrs. at 100° C. in a bomb gives 3-chloro-3-methyl-1-trifluoromethylcyclobutanecarboxylic acid (II, R=CF$_3$).

The lactones III can be prepared by reaction of the appropriate chloroacid II with sodium hydride and pyrolysis of the sodium salt. For example, the reaction of 3-chloro - 3-methyl - 1-trifluoromethylcyclobutanecarboxylic acid (II, R=CF$_3$) with sodium hydride and subsequent pyrolysis of the formed sodium salts gives the lactone III (R=CF$_3$).

The hydroxyacids IV can be prepared by heating the appropriate chloroacid II in dilute acid solution. The preparation of 3-hydroxy-3-methyl-1-trifluoromethylcyclobutanecarboxylic acid (IV, R=CF$_3$) is illustrated in Example XII.

The hydroxycarboxylic acids and their lactones can be polymerized to high molecular weight polyesters having recurring units of the formula given above by conventional condensation polymerization methods, i.e., by bulk, solution, and solid state polymerization methods. For example, 3-hydroxy-3-methylcyclobutanecarboxylic acid and 3-hydroxy-1,3-dimethylcyclobutanecarboxylic acid can be polymerized by heating in the presence of an acidic or basic esterification catalyst, e.g., antimony trioxide or sodium methoxide, to a temperature above the melting point of the acid and preferably at a temperature between 200° and 250° C. until a polymer having an inherent viscosity of at least 0.05 is obtained. The polymerization can be carried out at atmospheric or reduced pressure. It is convenient to begin the polymerization at atmospheric pressure and then complete it at a pressure of less than 1 mm. mercury absolute. The polymerization is preferably carried out in an inert atmosphere, e.g., in an atmosphere of nitrogen. The catalyst concentration employed is not critical, amounts ranging from 0.01 to 1.0% of the weight of the hydroxy acid being operable. Good results are obtained with catalyst concentrations ranging from 0.05 to 0.2% and these are preferred. Other specific esterification catalysts that can be employed include litharge, oxides of metals of Group V of the Periodic Table, metal alkoxytitanates, tetraalkyl titanates, and alkaline earth metal salts of weak acids, e.g., calcium acetate.

The lactones of the 3-hydroxy-3-methyl-(and 1,3-dimethyl) cyclobutanecarboxylic acids can be polymerized by heating them to a temperature of 80–200° C. or higher in the presence of an acidic or basic esterification catalyst in an amount ranging from 0.01 to 1.0% of the weight of the monomeric lactones present until a polymer having an inherent viscosity of at least 0.05 is obtained. The polymerization of the lactones can be carried out either in the presence or absence of an inert nonpolar organic solvent. Aliphatic hydrocarbons such as heptane are suitable inert solvents. Specific esterification catalysts that can be used in the process include sodium, sodium methoxide, triethylaluminum, trifluoroacetic acid and phosphorus pentafluoride. These catalysts are preferably used in concentrations ranging from 0.05 to 0.2% by weight of the monomeric lactones being polymerized.

Polymers of the lactones III can be prepared by heating the lactone in the presence of $BF_3$. For example, when the lactone (III, $R=CF_3$) is heated at 100° C. with a catalytic amount of $BF_3$, a homopolymer is obtained which can be melt pressed to clear, self-supporting films. Example XIV illustrates this reaction.

The 3-hydroxy-cyclobutanecarboxylic acids and lactones of this invention can be copolymerized in widely varying proportions with one or more copolymerizable monomers by the same general methods described above for preparation of their homopolymers. Copolymerizable monomers that are useful for this purpose include other hydroxy acids, e.g., lactic, ω-hydroxydecanoic, and hydroxypivalic acids; other lactones, e.g., propiolactone, α,α-bis(chloromethyl)propiolactone and glycolide; amino acids, e.g., ε-aminocaproic acid; lactams, e.g., ε-caprolactam; and cyclic ethers, e.g., ethylene oxide, propylene oxide, trioxane, and 3,3-bis(chloromethyl)oxetane. The preferred copolymers contain at least 40% by weight of recurring units derived from the hydroxycyclobutanecarboxylic acids or their lactones, but copolymers containing lesser amounts, e.g., as little as 5%, are also useful.

The polymers of this invention possess a variety of properties depending on various factors such as the particular monomers employed and the particular type of catalyst employed. Homopolymers having an inherent viscosity of at least 0.05 are obtained with antimony trioxide or sodium methoxide as catalyst which can be melt pressed or solvent cast into clear self-supporting films and hard adherent coatings. Crystalline homopolymers having inherent viscosities greater than 0.45 can be obtained by the use of sodium, triethylaluminum, trifluoroacetic acid or phosphorus pentafluoride as catalyst. The polymers made in the presence of trifluoroacetic acid and phosphorus pentafluoride melt cleanly at 180° to give viscous liquids. Both fibers and films can be prepared from these polymers but they are not capable of being drawn. Polymers made in the presence of sodium or triethylaluminum show an endotherm (by differential thermal analysis) at about 180° C., but they do not melt below 275° C. Above this temperature decomposition takes place. These polymers are readily soluble in organic solvents, and can be cast into clear films. The homopolymer prepared in the presence of sodium as catalyst can be formed into films and fibers that can be cold drawn with characteristic necking down.

The products of this invention are illustrated in further detail in the following examples in which the proportions of ingredients are expressed in parts by weight unless otherwise specified.

EXAMPLE I

To a solution of 8.4 parts (0.15 mole) of potassium hydroxide in 30 parts of water is added 9.3 parts (0.1 mole) of 1-cyano-3-methylbicyclo[1.1.0]butane and the mixture is heated at reflux for 3 hours. The resulting clear solution is acidified with 50% sulfuric acid to a pH of 2 and is then continuously extracted with diethyl ether for 24 hours. The ether extract is dried over anhydrous magnesium sulfate, filtered, and the ether is evaporated. The residual oily crystals are recrystallized from 1,2-dichloroethane and there is obtained 4.71 parts (36.2% of theory) of 3-hydroxy-3-methylcyclobutanecarboxylic acid as colorless needles, M.P. 152–153° C.

*Analysis.*—Calcd. for $C_6H_{10}O_3$: C, 55.32%; H, 7.68%. Found: C, 55.43%, 55.52%; H, 7.58%, 7.56%.

EXAMPLE II

To a solution of 11.3 parts of sodium hydroxide (0.28 mole) in 115 parts of water is added with stirring 33 parts (0.1375 mole) of 3-iodo-3-methylcyclobutanecarboxylic acid. The mixture is stirred for 2 hours and the resulting solution is acidified to a pH of 2 with 50% sulfuric acid. The acidic solution is extracted with diethyl ether, the ether phase is dried over anhydrous magnesium sulfate, filtered and the ether evaporated. Recrystallization of the residue from 1,2-dichloroethane gives 11.5 parts (64.5% of theory) of 3-hydroxy-3-methylcyclobutanecarboxylic acid in the form of colorless needles having a melting point of 151–153° C. A mixed melting point with the product from Example I is 151–153° C.

EXAMPLE III

To a solution of 16 parts of sodium hydroxide in 200 parts of water is added the crude 3-iodo-1,3-dimethylcyclobutanecarboxylic acid prepared from 25.2 parts of 1-methyl-3-methylenecyclobutanecarboxylic acid and 90 parts of 55% hydriodic acid. After 30 minutes the clear solution is acidified to a pH of 2 with concentrated hydrochloric acid. The acidic solution is extracted with four 90-part portions of hot ethyl acetate. The ethyl acetate extracts are combined, dried over anhydrous magnesium sulfate, filtered and the ethyl acetate evaporated. Two recrystallizations of the residue from ethyl acetate give 11.7 parts of 3-hydroxy-1,3-dimethylcyclobutanecarboxylic acid M.P. 134–136° C.

*Analysis.*—Calcd. for $C_7H_{12}O_3$: C, 58.33%; H, 8.34%. Found: C, 58.55%; H, 8.43%.

EXAMPLE IV (A) A reaction vessel fitted with a reflux condenser and a mechanical stirrer is charged with 198 parts of thionyl chloride and 40 parts of 3-hydroxy-3-methylcyclobutanecarboxylic acid. The mixture is stirred and heated to the reflux until gas evolution ceases, about 1–2 hours being required. The reaction mixture is distilled and there is obtained 36.3 parts of 3-chloro-3-methylcyclobutanecarboxylic acid chloride, B.P. 73–74° C. at 15 mm. Hg.

*Analysis.*—Calc'd. for $C_6H_8Cl_2O$: C, 43.10%; H, 4.78%; Cl, 42.50%. Found: C, 42.64%; H, 4.84%; Cl, 42.09%.

(B) The 3-chloro-3-methylcyclobutanecarboxylic acid chloride (36.3 parts) is added with stirring to 175 parts of water in a reaction vessel cooled in an ice bath. The mixture is stirred for 1.5 hours and the organic phase is separated. The aqueous phase is extracted with two 35-part portions of diethyl ether and the ether extracts are combined with the organic phase. The combined organic phase is dried over anhydrous magnesium sulfate, filtered and distilled. There is obtained 28 parts of 3-chloro-3-methylcyclobutanecarboxylic acid, V.P. 78–84° C. at 0.5 mm. Hg.

*Analysis.*—Calc'd. for $C_6H_9ClO_2$: C, 48.50%; H, 6.06%; Cl, 23.90%. Found: C, 48.25%; H, 6.17%; Cl, 23.58%.

(C) A slurry of 9 parts of 53% (by weight) dispersion of sodium hydride in mineral oil in 350 parts of diethyl ether is cooled in an ice bath and to this slurry is added 28 parts of 3-chloro-3-methylcyclobutanecarboxylic acid. The mixture is heated at reflux for 1–2 hours and then the ether is removed by distillation while 280 parts of mineral oil is added. The reaction mixture is then heated in a vessel fitted with a short distilling head and a receiver cooled by a mixture of solid carbon dioxide and acetone. The system is evacuated to 1–2 mm. Hg and then heated with stirring to 130° C., whereupon the lactone starts to distill. The temperature is maintained at 130–140° C. for two hours and then raised to 180° C. over two hours. The distillate is dissolved in 35 parts of diethyl ether and the resulting solution extracted twice with 25-part portions of 10% aqueous sodium bicarbonate solution. The ether solution is then dried over anhydrous magnesium sulfate, passed through a short column of activated alumina, and the column is eluted with diethyl ether. Distillation of the eluent gives 6.6 parts of the lactone, 1-methyl-2-oxabicyclo[2.1.1]hexan-3-one, B.P. 91–96° C. at 21 mm. Hg.

*Analysis.*—Calc'd. for $C_6H_8O_2$: C, 64.25%; H, 7.14%. Found: C, 64.91%, 64.82%; H, 7.24%, 7.35%.

The lactone, 1-methyl-2-oxabicyclo[2.1.1]hexane-3-one can also be prepared by reacting a solution of 6.5 parts of 3-hydroxy-3-methylcyclobutanecarboxylic acid in 45 parts of tetrahydrofuran with a solution of 10.7 parts of dicyclohexylcarbodiimide in 22 parts of tetrahydrofuran for a period of 16 hours. However, the yield of the lactone is lower than that obtained by the process of Example IV.

EXAMPLE V

To a stirred slurry of 2.2 parts of 56% sodium hydride-mineral oil dispersion in 35 parts of diethyl ether is added 12.7 parts of 3-iodo-1,3-dimethylcyclobutanecarboxylic acid. After 45 minutes, the mixture sets to a gelatinous mass. Filtration gives 13 parts of sodium 3-iodo-1,3-dimethylcyclobutanecarboxylic acid as a white solid. This solid is pyrolyzed at 94° C. and the white crystalline sublimate is recrystallized from hexane. There is obtained 1.5 parts of the lactone, 1,4-dimethyl-2-oxabicyclo[2.1.1]hexan-3-one, M.P. 51° C.

*Analysis.*—Calcd. for $C_7H_{10}O_2$: C, 66.60%; H, 7.94%. Found: C, 66.66%, 66.74%; H, 8.10%, 7.99%.

EXAMPLE VI

A solution of 268.5 parts (1.05 mole) of 3-iodo-1,3-dimethylcyclobutanecarboxylic acid in diethyl ether (total volume equal to 400 parts of water) is added over a period of 1 hr. to a stirred slurry of 56% sodium hydride in mineral oil dispersion (46.7 parts, 1.1 mole, of sodium hydride) in 1420 parts of diethyl ether cooled by means of an ice-water bath. The mixture is stirred for 15 hours at 0°–25° C. and then 900 parts of mineral oil is added. The ether is evaporated at reduced pressure and another 1300 parts of mineral oil is added. The reaction mixture is then heated in a distilling flask fitted with a receiver cooled by a mixture of solid carbon dioxide and acetone. The reaction mixture is heated to 80–110° C. at about 1–2 mm. Hg over a 5-hour period. The distillate consists of the crystalline 1,4-dimethyl-2-oxabicyclo[2.1.1]hexan-3-one and some ether. Recrystallization of the lactone from hexane gives 58.2 parts (43.7% of theory) of the lactone.

EXAMPLE VII

Three parts of 3-hydroxy-3-methylcyclobutanecarboxylic acid and 0.002 part of antimony oxide, $Sb_2O_3$, are placed in an open-end glass tube 10 mm. in diameter and 200 mm. long with a side arm near the open end. A capillary tube reaching to the bottom is placed in the reaction tube and air is removed by evacuating the tube and filling it with nitrogen for four cycles. A nitrogen atmosphere is then maintained in the tube by attaching to the side arm a nitrogen line with a mineral oil bubbler attached to a T in the line. The tube is immersed in a vapor bath at 222° C. and nitrogen is bubbled through the resulting melt by means of the capillary tube for a total of 30 hours. The pressure is then reduced to 0.1–0.2 mm. Hg and heating is continued for 9 hrs. The friable, amber, solid polymer obtained softens on a copper block at 45° C. to a viscous melt from which filaments can be drawn. A film of this polymer cast from actone on a glass plate provides a clear, hard, adherent coating which is not loosened by immersion in water for 2 months. The inherent viscosity of the polymer (measured in dimethylformamide at 0.5% concentration at 25° C.) is 0.05. The infrared absorptions at 5.81 microns and 8.7 microns correspond to the ester,

linkage, that at 3.4 microns corresponds to a saturated CH, and that at 7.25 microns corresponds to $CH_3—C$.

EXAMPLE VIII

Two parts of 1,4-dimethyl-2-oxabicyclo[2.1.1]-hexan-3-one is heated to reflux with 0.02 part of sodium methoxide. After heating for 2 hours the temperature rises from 136° to 190° C. The cooled mixture is extracted with hot hexane and there is left as a residue a solid polymer melting at 166–168° C. The infrared absorption spectrum of this polymer reveals a carbonyl band at 5.81 microns. The polymer is heat pressed at 170° C. into a clear film. This polymer of 1,4-dimethyl-2-oxabicyclo[2.1.1]hexan-3-one displays an inherent viscosity of 0.10 (measured at 0.5% concentration in trifluoroacetic acid).

EXAMPLE IX

Two parts of 1,4-dimethyl-2-oxabicyclo[2.1.1]hexan-3-one is heated with 0.02 part of sodium methoxide in 14 parts of heptane at reflux temperature for 4 hours. The mixture is cooled and filtered leaving a residue of 2.1 parts of polymer of 1,4-dimethyl-2-oxabicyclo[2.1.1]-hexan-3-one melting at 171–173° C. The infrared absorption spectrum of the polymer shows a band of 5.81 microns indicative of a polyester structure. The polymer has an inherent viscosity of 0.19 (measured at 0.5% concentration in trifluoroacetic acid) and it can be pressed at 170° C. into a clear film.

EXAMPLE X

To a dry 6″ glass test tube is added under an atmosphere of nitrogen a small piece of freshly cut sodium. This sodium is ground against the bottom of the tube with a glass rod to expose a large area of fresh metal. One part of the lactone, 1-methyl-2-oxabicyclo[2.1.1]hexan-3-one, is added and the tube is tightly sealed and placed in an oil bath at 70° C. Polymerization proceeds slowly with solid polymer growing outward from the surface of the sodium. After 48 hours at 70° C. most of the molten monomer is converted to white polymer. This polymer has an inherent viscosity (determined at 0.5% concentration in chloroform) of 5.0. This polymer is soluble in chlorobenzene and the resulting chlorobenzene solution is cast into a film which, after drying, is drawn at 125° C. to give a crystalline, oriented film with a wide angle X-ray orientation of 15°. This polymer becomes quite workable after standing several minutes at 225° C. and long fibers are pulled from the melt. These fibers are readily drawn at 50° C. with characteristic necking down of the fiber. The oriented fibers, after boiling off taut, have the following properties: tenacity, 2.5 g./d.; elongation at break, 55%; initial modulus, 23 g./d.

EXAMPLE XI

One part of the lactone, 1-methyl-2-oxabicyclo-[2.1.1] hexan-3-one, is polymerized with approximately 0.7 part of an 0.82 molar solution of triethylaluminum in hexane as catalyst at 60° C. After 16 hours of polymerization, there is obtained a 99% yield of a solid polymer having an inherent viscosity (determined at 0.5% concentration in trifluoroacetic acid) of 0.60. This polymer does not melt to a free flowing liquid but becomes rubbery. At 275° C. the polymer decomposes quite rapidly.

EXAMPLE XII

To 20 parts of 2 N hydrochloric acid is added 1 part of 3 - chloro - 3 - methyl - 1 - trifluoromethylcyclobutanecarboxylic acid and the mixture is heated at reflux for 15 hours. The hydrochloric acid is then evaporated and the residue is recrystallized twice from 15-part portions of 1,2-dichloroethane. The crystals obtained are sublimed at 100° C. and 1.0 mm. Hg to give 0.66 part of 3-hydroxy - 3 - methyl-1-trifluoromethylcyclobutanecarboxylic acid, M.P. 90–94° C.

*Analysis.*—Calc'd for $C_7H_9F_3O_3$: C, 42.40%; H, 4.55%; F, 28.80%. Found: C, 43.79%, 42.70%, 43.23%; H, 4.94%, 4.83%, 5.10%; F, 28.60%, 28.71%.

The 3 - chloro-3-methyl-1-trifluoromethylcyclobutanecarboxylic acid starting material in Example XII can be prepared in two steps from α-trifluoromethylacrylonitrile and allene as follows:

(A) A pressure vessel is charged with 73.6 parts of α-trifluoromethylacrylonitrile (U.S. Patent 2,541,466), 40 parts of allene, 62 parts of benzene and 2 parts of hydroquinone. The reaction vessel is heated at 200° C. for 8 hours and then the reaction mixture is distilled. There is obtained 56.9 parts of 3-methylene-1-trifluoromethylcyclobutanecarbonitrile, B.P. 77° C./106 mm., $n_D^{25}$ 1.3869.

*Analysis.*—Calc'd for $C_7H_6NF_3$: C, 52.15%; H, 3.73%; N, 8.70%; F, 35.40. Found: C, 52.35%, 52.23%; H, 3.75%, 3.75%; N, 9.14%, 9.15%; F, 35.01%.

(B) A pressure vessel is charged with 27.4 parts of 3-methylene - 1 - trifluoromethylcyclobutanecarbonitrile and 567 parts of 12 N hydrochloric acid. The vessel is heated at 100° C. for 8 hours. After cooling, the solid reaction product is collected by filtration and there is obtained 31.21 parts of crystalline 3-chloro-3-methyl-1-trifluoromethylcyclobutanecarboxylic acid.

*Analysis.*—Calc'd for $C_7H_8ClF_3O_2$: C, 38.80%; H, 3.69%; Cl, 16.39%; F, 26.30%. Found: C, 38.86%; H, 3.47%, 3.50%; Cl, 16.89%, 17.03%; F, 26.08%, 26.22%.

EXAMPLE XIII

To a slurry of 8 parts of 53% by weight sodium hydride mineral oil dispersion in 280 parts of diethyl ether in a reaction vessel cooled by a bath of ice and water, there is added a concentrated solution of 37.5 parts of 3-chloro - 3-methyl-1-trifluoromethylcyclobutanecarboxylic acid in diethyl ether. The mixture is heated at reflux for 1 hour and then the ether is removed by distillation while 320 parts of mineral oil is added. The vessel is then equipped with a short distilling head and a receiver cooled by solid carbon dioxide and acetone. The system is evacuated to 1–2 mm. Hg and heated at 160–180° C. for 4 hours. The distillate is recrystallized from hexane and there is obtained 9.1 parts of 1-methyl-4-trifluoromethyl-2-oxabicyclo[2.1.1]hexan-3-one, M.P. 61–62° C.

*Analysis.*—Calc'd for $C_7H_7F_3O_2$: C, 46.65%; H, 3.89%; F, 31.65%. Found: C, 45.73%, 45.98%; H, 3.61%, 3.61%; F, 31.66%, 31.34%.

When the procedures of Examples XII and XIII are repeated with equivalent quantities of 3-chloro-3-methyl-1-difluoromethylcyclobutanecarboxylic acid,
3-chloro-3-methyl-1-pentafluoroethylcyclobutanecarboxylic acid, and
3-chloro-3-methyl-1-heptafluoropropylcyclobutanecarboxylic acid,
respectively, substituted for the 3-chloro-3-methyl-1-trifluoromethylcyclobutanecarboxylic acid of these examples, the following acids and lactones are obtained:
3-hydroxy-3-methyl-1-difluoromethylcyclobutanecarboxylic acid,
3-hydroxy-3-methyl-1-pentafluoroethylcyclobutanecarboxylic acid,
3-hydroxy-3-methyl-1-heptafluoropropylcyclobutanecarboxylic acid,
1-methyl-4-difluoromethyl-2-oxabicyclo[2.1.1]hexan-3-one,
1-methyl-4-pentafluoroethyl-2-oxabicyclo[2.1.1]hexan-3-one, and
1-methyl-4-heptafluoropropyl-2-oxabicyclo[2.1.1]hexan-3-one.

EXAMPLE XIV

A dry 6″ test tube is charged with 0.9 part of 1-methyl-4-trifluoromethyl-2-oxabicyclo[2.1.1]hexan-3-one and the tube is stoppered. The tube is then heated at 68° C. and when the lactone is molten approximately 0.001 part of boron trifluoride-etherate is added. Polymerization takes place rapidly with formation of a solid white polymer. After 1.5 hours polymerization at 68° C., the polymer that is formed is dissolved in 10 parts of trifluoroacetic acid. This solution is poured with stirring into 100 parts of methanol, whereupon the polymer precipitates. The polymer is separated by filtration and then air-dried. There is obtained 0.5 part of white polymer which has an inherent viscosity of 0.52 (determined at 0.1% concentration in trifluoroacetic acid at 25° C.). Samples of this polymer can be pressed at 100° C. into clear self-supporting films.

When 1 - methyl-4-difluoromethyl-2-oxabicyclo[2.1.1]-hexan-3-one, 1 - methyl-4-pentafluoroethyl-2-oxabicyclo[2.1.1]hexan-3-one, and 1-methyl-4-heptafluoropropyl-2-oxabicyclo[2.1.1]hexan-3-one are substituted for the lactone used in Example XIV and polymerized in the same manner, the respective homopolymers of these lactones are formed.

EXAMPLE XV

Two parts of pivalolactone, 2 parts of 1,4-dimethyl-2-oxabicyclo[2.1.1]hexan-3-one and 0.02 part of sodium methoxide are heated together in a reaction vessel fitted with a condenser and mechanical stirrer. Polymerization occurs at 100° C. giving a solid product which melts at a bath temperature of 200° C. The reaction mixture is heated at 200° C. for 3 hours, then cooled, triturated with hexane and filtered to give 3.5 parts of copolymer of pivalolactone and 1,4-dimethyl-2-oxabicyclo[2.1.1]hexan-3-one melting at 190–192° C. This copolymer can be melt pressed at 170° C. into clear film. The inherent viscosity of the polymer is 0.19 (measured in trifluoroacetic acid at 0.5% concentration).

When the pivalolactone comonomer of Example XV is replaced by one or more of the specific copolymerizable monomers listed in the first column of the following Table I, and/or the 1,4-dimethyl-2-oxabicyclo[2.1.1]hexan-3-one, is replaced by 1-methyl-2-oxabicyclo[2.1.1]hexan-3-one, 1 - methyl - 4 - trifluoromethyl-2-oxabicyclo[2.1.1]-hexan-3-one, or 1 - methyl-4-heptafluoropropyl-2-oxabicyclo[2.1.1]hexan-3-one and polymerization is carried out in a manner similar to that described above, the copolymers listed in the second column of Table I can be obtained.

*Table I.—Copolymers*

| | |
|---|---|
| Pivalolactone | 1 - methyl - 2 - oxabicyclo[2.1.1]hexan - 3 - one/pivalolactone. |
| β,β - Dimethylpropiolactone | 1,4 - dimethyl - 2 -oxabicyclo[2.1.1] - hexan - 3 - one/β,β - dimethylpropiolactone. |
| 3,3 - bis(chloromethyl)oxetane | 1 - methyl - 2 - oxabicyclo 2.1.1 3-one/3,3-bis(chloromethyl)oxetane. |
| Lactide | 1,4 - dimethyl-2-oxabicyclo[2.1.1] - hexan - 3 - one/lactide. |
| Trioxane | 1,4 - dimethyl - 2 - oxabicyclo[2.1.1] - hexan - 3-one/trioxane. |
| ε-Caprolactam | 1 - methyl - 2 - oxabicyclo[2.1.1] - hexan - 3 - one/ε-caprolactam. |
| Pivalolactone | 1 - methyl - 4 - heptafluoropropyl - 2 - oxabicyclo[2.1.1]hexan - 3 - one/pivalolactone. |

Table I.—Continued

Lactide _____ 1 - methyl - 4 - trifluoromethyl - 2 - oxabicyclo-[2.1.1]hexan - 3 - one/lactide.

The monomers of this invention are especially useful for polymerization to polyesters that are in turn useful for various purposes. The polymers are soluble in organic solvents, e.g., trifluoroacetic acid and chlorobenzene, and such solutions can be used for the casting of films and as coating compositions. The resulting coating compositions can be used for coating metal, wood, glass, etc. to provide protective coatings. The films and fibers prepared from the polymers of this invention can be used for a variety of purposes. Some of the films and fibers, depending on the method of polymerization employed can be cold drawn.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. 3-hydroxy-3-methylcyclobutanecarboxylic acid.
2. 3-hydroxy-1,3-dimethylcyclobutanecarboxylic acid.
3. 1-methyl-2-oxabicyclo[2.1.1]hexan-3-one.
4. 1,4-dimethyl-2-oxabicyclo[2.1.1]hexan-3-one.
5. 3 - hydroxy-3-methyl-1-trifluoromethylcyclobutanecarboxylic acid.
6. 1-methyl-4-trifluoromethyl-2 - oxabicyclo[2.1.1]hexan-3-one.
7. Process which comprises (I) contacting and reacting an aqueous solution of an alkali metal hydroxide with a compound selected from the group consisting of
   (a) carboxylic acids of the formula

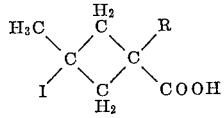

wherein R is selected from the class consisting of hydrogen and methyl and
   (b) 1-cyano-3-methylbicyclo[1.1.0]butane, with the provisos that said carboxylic acids be reacted at a temperature in the range 0° C. to 100° C. and that said 1-cyano-3-methylbicyclo[1.1.0]butane be reacted at a temperature in the range 50° C. to 150° C., (II) adding mineral acid in an amount sufficient to produce a reaction medium of pH between 2 and 7, and (III) recovering the resultant hydroxycarboxylic acid.

8. Process for preparing lactones of hydroxycarboxylic acids which comprises contacting and reacting, in a solvent inert to the reactants and reaction products,
   (a) a carboxylic acid of the formula

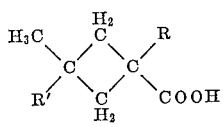

wherein R is selected from the class consisting of hydrogen and methyl and R' is selected from the class consisting of hydroxy, chloro, bromo and iodo with
   (b) a compound selected from the class consisting of alkali metal hydrides and dihydrocarbylcarbodiimides, with the provisos that when R' is hydroxy, a dihydrocarbylcarbodiimide be selected and reacted at a temperature in the range 0° C. to 100° C. to obtain the resultant lactone and that when R' is other than hydroxy, an alkali metal hydride be selected and reacted at a temperature below 80° C. to obtain an alkali metal salt of the carboxylic acid, which salt is pyrolyzed by heating at a temperature in the range 80° C. to 180° C. to obtain the resultant lactone.

9. Process which comprises contacting and reacting a 3-alkylidene-1-perfluoroalkylcyclobutanecarbonitrile with concentrated hydrochloric acid at approximately 100° C., heating the resultant chloroacid further in dilute acid solution, and recovering the resultant hydroxycarboxylic acid.

10. Process which comprises contacting and reacting, at approximately 100° C., a 3-methylene-1-perfluoroalkylcyclobutanecarbonitrile with hydrochloric acid, reacting the resultant chloroacid with sodium hydride, pyrolyzing the sodium salt obtained thereby, and recovering the resultant lactone.

11. A lactone of the formula

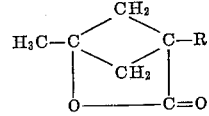

wherein R is a member of the class consisting of hydrogen, methyl, and fluoroalkyl of 1 to 6 carbon atoms.

12. A hydroxycarboxylic acid of the formula

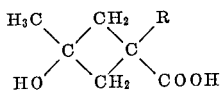

wherein R is a member of the class consisting of hydrogen, methyl and fluoroalkyl of 1 to 6 carbon atoms.

13. A polymer of an acid of claim 12 having an inherent viscosity of at least 0.05 and containing, to the extent of at least 5% by weight, recurring units of the formula

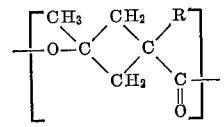

wherein R is selected from the group consisting of hydrogen, methyl and fluoroalkyl of 1 to 6 carbon atoms.

14. A homopolymer of an acid of claim 12 having an inherent viscosity of at least 0.05 and comprising the recurring unit

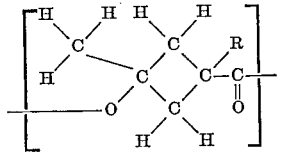

wherein R is as defined in claim 12.

15. A copolymer of
   (a) an acid of claim 12, and
   (b) at least one other polymerizable monomer of the group consisting of hydroxyacids, aminoacids, lactones, lactams and cyclic ethers; said copolymer having at least
      (1) 5% by weight of the recurring unit

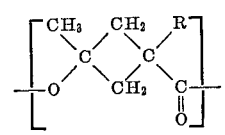

wherein R is as defined in claim 12, and
      (2) an inherent viscosity of at least 0.05.

No references cited.

JAMES A. SEIDLECK, *Primary Examiner.*

JOSEPH L. SCHOFER, *Examiner.*

L. G. CHILDERS, *Assistant Examiner.*